May 23, 1950  A. HÉRENG  2,508,884
HYDROLYSIS TOWER
Filed Sept. 17, 1945  2 Sheets-Sheet 2
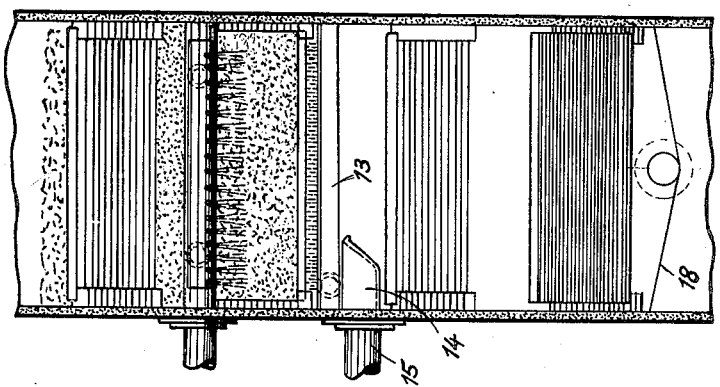
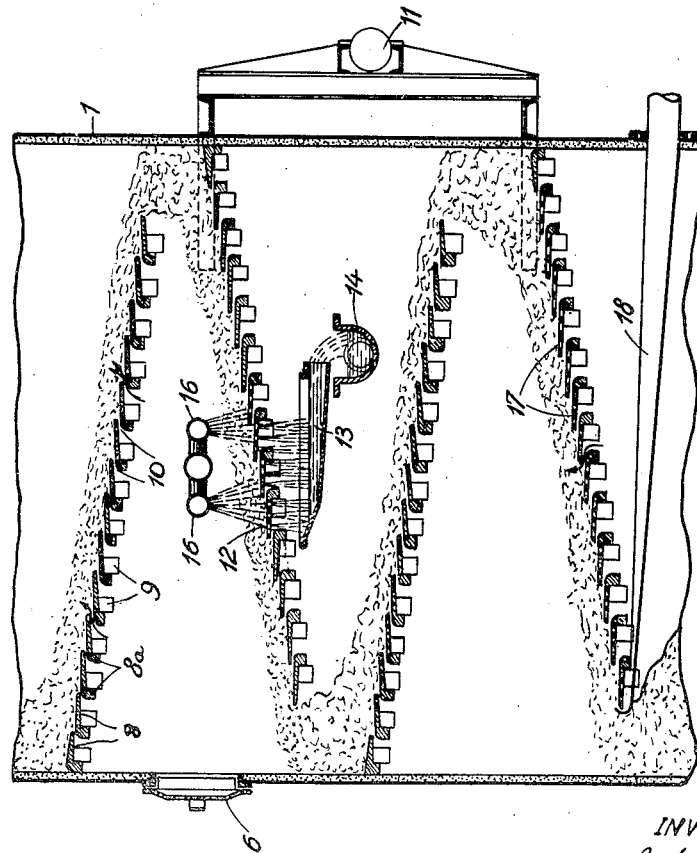
INVENTOR
André Héreng
BY
Paul Koisch
ATTORNEY Patented May 23, 1950

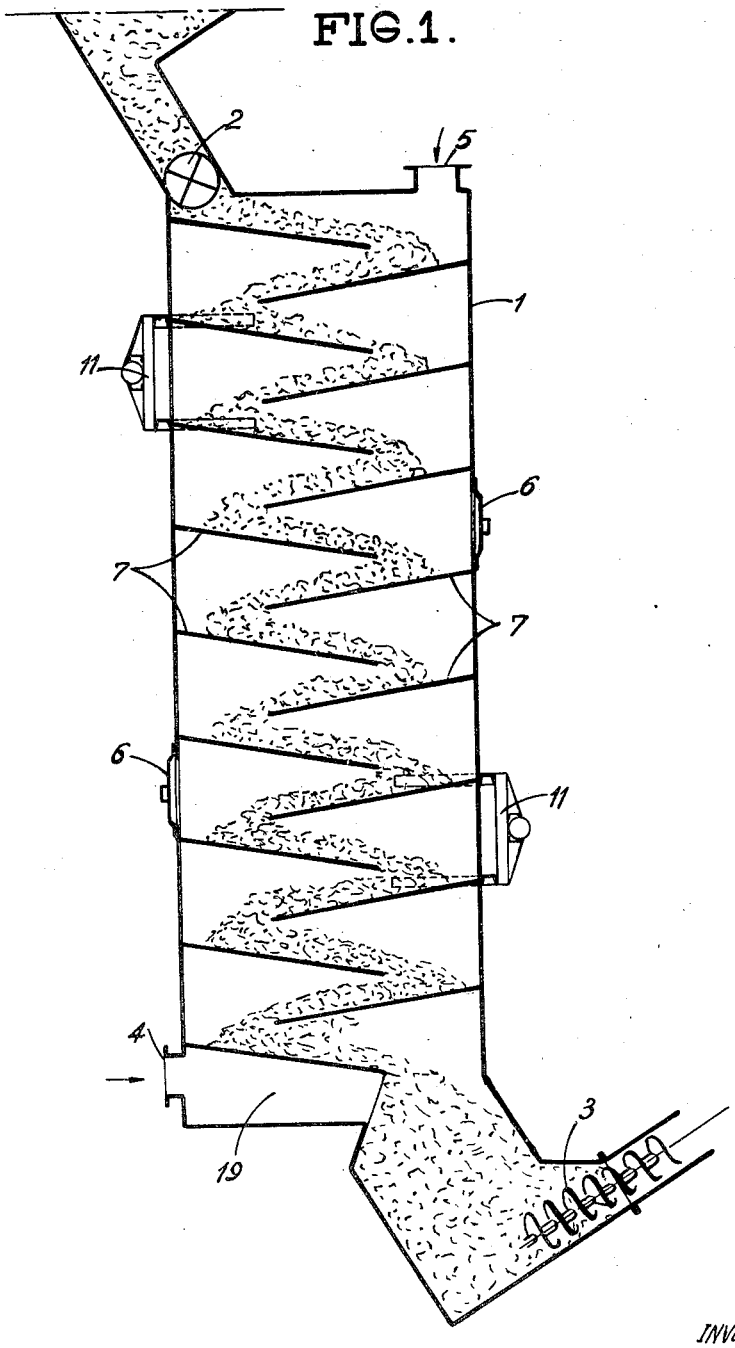

2,508,884

UNITED STATES PATENT OFFICE 2,508,884

HYDROLYSIS TOWER

André Héreng, Paris, France

Application September 17, 1945, Serial No. 616,830
In France July 26, 1945

2 Claims. (Cl. 23—283)

The present invention has for its subject-matter a device for the continuous treatment of liquid impregnated solid materials. More particularly, the invention relates to the treatment of vegetable materials with acids, especially preparatory to the saccharification of said materials or to their drying after hydrolysis.

As a matter of fact, one generally uses, for such treatments, important appliances such as diffuser batteries which require intricate piping and valve systems. This generally results in that the working up of solid materials entails considerable expenses for the first equipment as well as very high working costs.

The device which forms the subject-matter of the present invention makes it possible, with a reduced cost for the first equipment, to insure the continuous treatment of the materials in question in a simple manner and with a relatively untrained staff.

Said device essentially consists of a tower inside which blades formed into ramps slope alternately in reverse directions, each ramp receiving the products treated on the next upper ramp, the downward movement of said products being insured by vibrators externally secured to the walls of the tower.

Owing to the ramp arrangement in conjunction with the action of the vibrators the material discharged onto the ramps runs down progressively in the tower while being constantly stirred, which promotes the treatment throughout the whole mass. The slope of the ramps can be small, which makes it possible to reduce the height of the tower and, therefore, the expenses for the construction of the latter. Also, the gaseous products have access to the material being treated by passing through the blades, thus promoting the regularity of the processes and carrying them out in a continuous manner.

Certain of the blades are perforated for allowing the liquids to pass, which permits either making local extraction or controlling the reactions in a suitable manner.

Combined with the blades are devices for discharging liquids such as water, worts, juices, acids and the like onto the material being treated and devices for receiving liquids such as sugar-loaded juices located beneath said blades. Said devices make it possible to insure the control of the operations and even to modify their development in the desired direction.

Heating or cooling means can be associated either with the tower or with a portion of the latter or with the devices for working up the above mentioned sprinkling liquids.

A form of execution of the device according to the invention provided for the treatment of plants with acids is shown by way of example in the appended drawings, in which:

Figure 1 is a general sectional vertical view of the whole.

Figure 2 is a vertical sectional view showing some elements of the device on a larger scale, and Figure 3 is a sectional view through line A—A of Figure 2.

The device essentially consists of a tower 1. The latter has a rectangular section in order to facilitate its construction, but said section could also have another shape. The walls of the tower are made of an acid-proof material such as basalt, wood treated with Bakelite, steel sheet with an inner ebonite lining, lava or the like product, reinforced cement covered with ceramics and the like. On the top of the tower is arranged the device 2 for the distribution of the products to be treated. In the lower part of the tower is provided a device 3 for removing the treated products. Means such as 4, 5 for the introduction of the treating fluids are arranged in a suitable manner as well as inspection openings 6.

From the top to the bottom of the tower are arranged horizontal blades 8 formed into shelf ramps generally indicated at 7 which slope alternately in contrary directions. The blades 8 may be of ceramic or other acid resistant material and each blade has a projection or heel 8a contacting a support 9. Individual supports 9 are secured to the walls of the tower 1 beneath each blade so that the blades rest on individual supports. Said superposed blades partly overlap one another so that the material being treated and leaving a blade falls on the next lower blade. Nevertheless said blades leave between one another passages 10 for the gases but without allowing solid or liquid materials to pass through 10.

Vibrators 11 are externally secured to the walls of the tower. The vibrations are transmitted to each individual blade 8 and to the material resting thereupon, said material being thus maintained in a state of turbulence and falling down regularly on the ramps without it being necessary to provide internal stirring means in the tower. The slope of the ramps is determined experimentally for allowing the material being treated to remain during a suitable time in the tower for the treatment which it is to undergo. The combined use of the ramps 7 and of the vibrators 11 makes it possible to insure the continuous passage of the material notwithstanding the slight slope of the ramps 7, which considerably reduces the space required by the tower 1.

Certain blades such as 12 are perforated like a sieve for permitting local extractions of liquid. The liquid falls then into a trough 13 whereafter it flows into an overfall 14 from which it is extracted by a piping 15. It is thus possible to effectuate a partial extraction of the juices or simply to make a sampling.

Perforated tubes such as 16 permit a local sprinkling combined or not combined with the taking or sampling at 13—14—15.

Likewise, it is possible to collect on one or two stages the liquid products formed on the preceding stages. The blades of said stage or stages are then entirely perforated as indicated at 17. They can be sprinkled with water or acid. The liquid products are collected in the trough 18 made of ebonite lined metal sheet.

In the lower part of the tower a chamber 19 is arranged which receives through the pipe branch 4 a gas insuring the treatment of the material falling down on the successive ramps 7.

The device described above as being able to be used for the treatment of vegetable material with acids can also be used for the treatment of any other solid liquid-impregnated materials. It is more particularly suitable for the saccharification of wood and can advantageously replace the diffusers generally used for this operation. It can also be used for insuring the drying and the recovery of the acid from the products which have been submitted to the saccharification. It would also be possible to use it for any similar treatment to be effected on materials of similar consistences.

I claim:

1. In a hydrolysis tower for treating acid impregnated solid substances, a plurality of sloping shelves defining a zigzag path from the top to the bottom of the tower, each of said shelves comprising a plurality of horizontal overlapping blades, a plurality of individual supports for each of said blades fastened to the walls of said tower, each of said blades having a downwardly directed projection for contacting a side of a support to form the only securing means between a blade and its support, means for vibrating the walls of the tower thereby vibrating the blades and their supports to move said substances towards the bottom of the tower, the inside walls of the tower, the blades and supports being of acid resistant material.

2. The tower according to claim 1, and perforations in some of said blades, a sprinkler above said blades, and a trough below the blades for collecting liquid.

ANDRÉ HÉRENG.

REFERENCES CITED

The following references are of record in the file of this patent:

UNITED STATES PATENTS

| Number | Name | Date |
|---|---|---|
| 86,192 | Walker | Jan. 28, 1869 |
| 271,604 | Cook | Feb. 6, 1883 |
| 605,772 | Barthelemy | June 14, 1898 |
| 693,455 | Stanley | Feb. 18, 1902 |
| 999,213 | Durant | Aug. 1, 1911 |
| 1,365,950 | Putnam | Jan. 18, 1921 |
| 1,472,314 | Webster | Oct. 30, 1923 |
| 1,535,804 | Bergman | Apr. 28, 1925 |
| 1,941,499 | Siems | Jan. 2, 1934 |
| 2,066,251 | Clemens | Dec. 29, 1936 |